March 16, 1965 — A. M. SCHULTZ — 3,173,217
ARTIFICIAL POPULATION MODEL FOR TEACHING PURPOSES
Filed July 25, 1961 — 2 Sheets-Sheet 1

INVENTOR.
ARNOLD M. SCHULTZ
BY Lothrop & West
ATTORNEYS

March 16, 1965  A. M. SCHULTZ  3,173,217
ARTIFICIAL POPULATION MODEL FOR TEACHING PURPOSES
Filed July 25, 1961  2 Sheets-Sheet 2
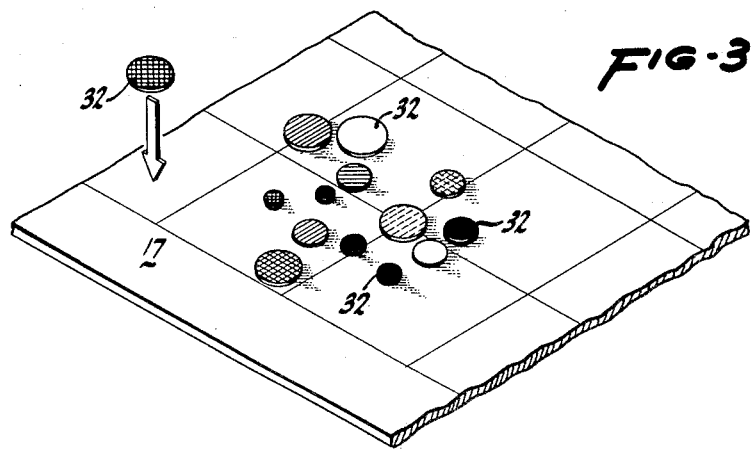
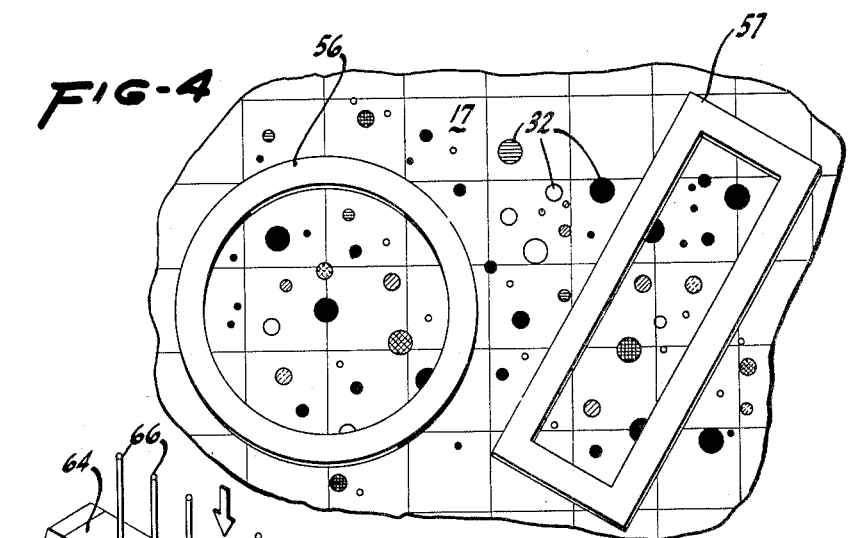
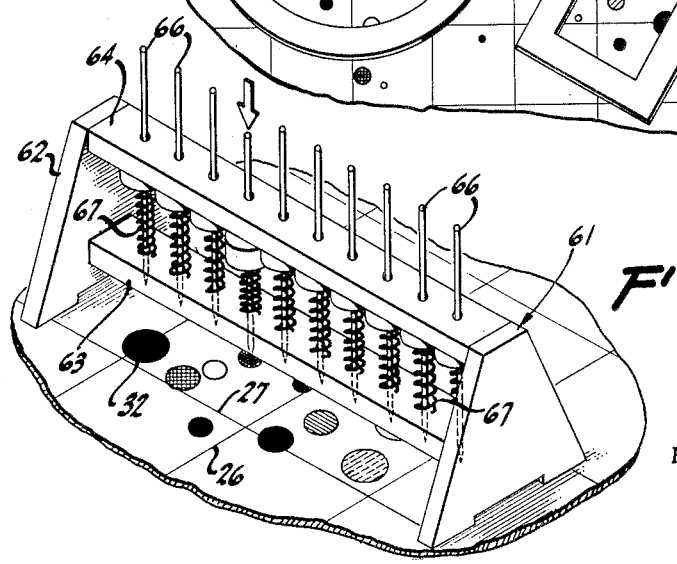
INVENTOR.
ARNOLD M. SCHULTZ
BY Lothrop & West
ATTORNEYS

United States Patent Office 3,173,217
Patented Mar. 16, 1965

3,173,217
ARTIFICIAL POPULATION MODEL FOR
TEACHING PURPOSES
Arnold M. Schultz, Berkeley, Calif., assignor to The
Regents of The University of California, Berkeley,
Calif.
Filed July 25, 1961, Ser. No. 126,646
2 Claims. (Cl. 35—8)

My invention relates primarily to a teaching aid especially useful in connection with certain studies in ecology and also useful in connection with the study of statistics and statistical sampling methods.

In introducing students to the subject of ecology, among others, it is deemed desirable to afford them a good basis of statistical understanding. This is useful in connection with various ecological problems particularly having to do with ground cover, range extent and various distributions of vegetation or herbage. In addition, there are various other fields in which sampling techniques, particularly those which in some phase can be physically represented, are of scholastic importance. It has been found by substantial experience that most students respond well to statistical teaching and learn statistical and sampling methods (particularly in ecological areas) when some sort of visual aid is employed in addition to the normal mathematical approach.

It is therefore an object of my invention to provide an artificial population model for teaching purposes which will be effective not only to indicate a general approach to statistical methods, particularly sampling, but will also indicate the application of statistical and sampling techniques to certain ecological problems.

Another object of the invention is to provide such a device which can easily and quickly be made and used, which is economical and which can be carried about from place to place with little or no difficulty.

Another object of the invention is to provide an artificial population model which can serve various technical and scientific purposes in representing certain populations and in yielding information with respect thereto.

Another object of the invention is to provide an artificial population model with which various sampling techniques, some of them well known in themselves, can easily be utilized.

Another object of the invention is to provide an artificial population model affording considerable accuracy.

Another object of the invention is in general to provide an improved teaching aid.

Other objects together with the foregoing are attained in the embodiment of the invention described in the accompanying description and illustrated in the accompanying drawings in which:

FIGURE 3 is a detail showing in perspective a portion of an indicia sheet with certain sampling devices in position thereon and illustrating diagrammatically a part of the use of the structure, the portions not illustrated being broken away to simplify the figure.

FIGURE 4 is a fragmentary plan of a portion of an indicia sheet with a couple of sampling aids thereon shown in perspective.

FIGURE 5 is a fragmentary view showing in perspective a form of sampling mechanism useful with the artificial population model of FIGURES 1 and 2.

Figure 1:
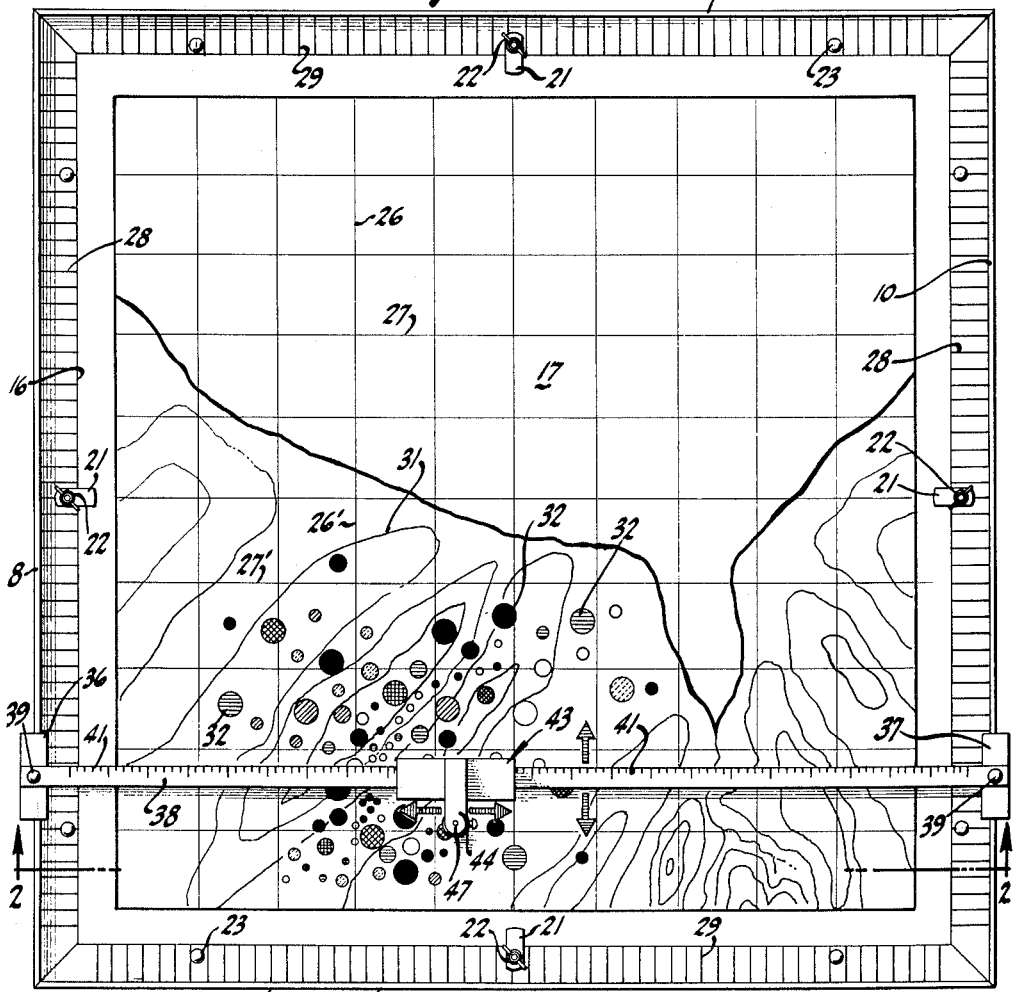
FIGURE 1 is a plan of an artificial population model as it has in practice been embodied for use in university teaching.
Figure 2:
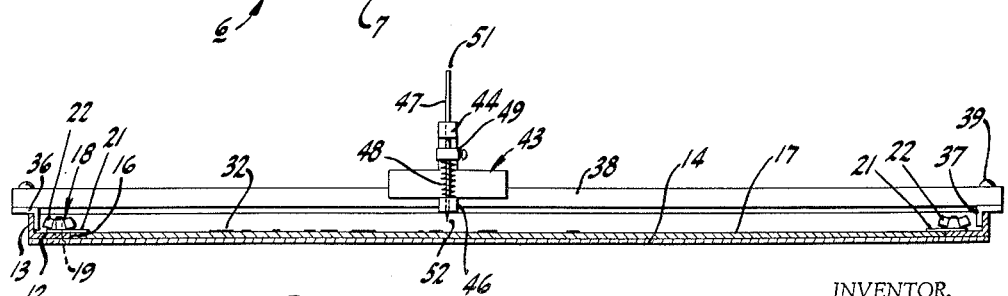
FIGURE 2 is a cross section, the plane of section being indicated by the line 2—2 of FIGURE 1.

While it is possible to embody an artificial population model in various different ways to carry out the general intent and purposes of the invention, there has been one embodiment of particular practical success as shown particularly in FIGURES 1 and 2.

In this arrangement there is provided a rectangular frame generally designated 6 and comprised of four frame members 7, 8, 9 and 10 of comparable lengths to constitute a square framework enclosing an interior space. The members of the framework 6 are substantially identical and are conveniently made of metal such as aluminum, which is light but relatively stiff and stable. Each of the frame members includes a shape, angular in cross section, having a ledge 12 of substantially planar extent and also having normal or perpendicular thereto an upstanding or upright flange 13. These frame parts can easily be fabricated of commercially available angles. The frame members are mitered at their ends to afford joined corners secured in any suitable way; for example, by welding, and are so assembled with the ledges 12 facing each other and coplanar.

Secured to and abutting the bottom surfaces of the frame members is a planar base sheet 14 of any suitable relatively stiff, light material such as aluminum or "Masonite." The outer boundaries of the base sheet 14 coincide substantially with the outline of the frame 6 and the base sheet thus underlies a defined or delimited space bounded by the inner edges 16 of the frame ledges 12.

Designed to rest on the planar base sheet and rather accurately to fit within and to abut against the edges 16 is an indicia sheet 17. This sheet likewise is made of a relatively stiff, light material either metallic or "Masonite" or in some instances of transparent plastic. The indicia sheet is designed to fit within the confines of the framework and to be accurately positioned so that the upper surface of the indicia sheet is substantially coplanar with the upper surface of the various ledges 12.

The indicia sheet is conveniently held in place for easy installation and ready removal by fastening devices exemplified by the device 18. This includes a countersunk through bolt 19, the bottom portion of which is flush with the bottom of the base sheet. The bolt 19 extends upwardly through the appropriate ledge of the frame member and carries a rotatable finger 21. This can be revolved to overlie the ledge only or can be revolved to overlie the indicia sheet, as shown in FIGURES 1 and 2. A thumb nut 22 in engagement with the finger 21 and the bolt 19 can be loosened so that the fingers can be turned to one side and the indicia sheet positioned or removed. When the fingers are in position over the indicia sheet the wing nuts can be tightened so that the entire assembly is held securely. The fastening members 19 help to hold the base sheet and the framework in position but in addition there are provided permanent fasteners 23 passing through the ledges of the framework and the base sheet and riveted.

If the device is designed to be used with successive transparent indicia sheets, the base sheet 14 can be provided with coordinate ruling grooves or marks 26 and 27 visible through the superposed sheet. Also, and especially if the indicia sheet is opaque, the indicia sheet itself is provided with rectangular rulings $26^1$ and $27^1$ constituting various coordinates. It is convenient also to have the framework 6 itself marked with various rulings such as 28 and 29. In some instances, these coincide with or continue the coordinates $26^1$ and $27^1$ and in some instances do not, but the rulings 28 and 29 are generally useful for measuring or locating purposes.

While there is shown a single indicia sheet 17, it is sometimes the case that the indicia sheet is laminated, being made up of a pre-printed base with a separate or an attached overlay or overlays of a smooth plastic or the like. In some instances the indicia sheet or some part of it carries markings 31 such as contours or area outlines.

The markings, such as 31, on the indicia sheet are often supplemented by markers 32. Depending on the particular problem, these markers 32 are of various different diameters having a particular significance and also may vary in color to afford color significance, various colors being illustrated in the figures by different cross hatching. Furthermore, each of the individual markers 32 is positioned on the grid or coordinate system 26 and 27 or 26¹ and 27¹ in accordance with a statistical arrangement.

One way to do this is to arrange that the position of the center of a marker 32, for example, with respect to the ordinates 26 or 26¹ is arbitrarily or randomly arranged by choosing a random number. This number can be derived either from published tables of random numbers or by taking at random a number established by a computer or in any other chance fashion. Similarly, the position of the particular marker with respect to the abscissae 27 or 27¹ is established by taking a second random number in the same or any other comparable way. Thus a representative marker 32 has its center precisely positioned at a point established purely at random and measured or sealed by the coordinates 26 or 26¹ and the coordinates 27 or 27¹. The size of the particular marker so positioned can also be selected by lot or in any random manner. All of these things are effective in familiarizing students with a statistical approach to problem solution and give them practice in the use of random selection and random positioning.

In accordance with the invention, means are provided for utilizing the various markers 32. These can be fastened in place for repetitive use but usually simply rest upon the indicia sheet. Preferably the markers 32 have some substantial thickness and so extend well above the sheet as shown particularly in FIGURES 2 and 3. Designed to operate on the flanges 13 are slides 36 and 37 constituted by short lengths of inverted angles having vertical flanges depending alongside the faces of the upstanding flanges 13 and having coplanar horizontal flanges overlying the upper edge of the flanges 13.

The slides 36 and 37 are joined by a bridge bar 38, conveniently a rectangular light metal member secured in position on the slides 36 and 37 by rivets 39. With this arrangement the slide can easily be moved to and fro on the framework in parallelism with the coordinates 27 and 27¹ so as to overlie any part of the structure, the height of the bridge bar above the indicia sheet being sufficient so as to clear the wing nuts 22. The bridge bar itself is conveniently inscribed with marks 41 so that some direct or indirect relationship to the underlying coordinate system can be availed of.

In addition to the bridge bar, there are provided further means for reading the position of the markers 32. For example, there is a carriage 43, conveniently fabricated of a channeled block, riding on the bridge bar. The carriage has an extension 44 in vertical alignment with an extension 46 and an indicator pin 47 is slidably mounted therein. A spring 48 rests on the upper surface of the extension 46 and is held in position against an adjustable collar 49 set on the pin. The pin 47 has a blunt upper end 51 but a sharp lower point 52. The pin is offset from the carriage 43 and from the bar 38 so that the pin 47 can readily be depressed by the finger of a user with the point 52 coming down into an exactly determinable spot on the subjacent indicia sheet.

After the markers 32 have been positioned at random following a random selection of their colors and sizes, the students utilize the mechanism for determining or reading the location, the size and the color character of the predisposed markers. That is accomplished by methodically moving the bridge bar in a sliding fashion along the framework into successive positions as read off by the marking indicia. Also the slide 43 is methodically traversed on the bridge bar to pass successive coordinates. At stated or predetermined distance intervals the user depresses the pin 47 against the urgency of the spring 48 until the sharp point 52 either contacts the subposed indicia sheet, in which case no notation is made, or the point comes into contact with some portion of a subjacent marker 32. If this occurs, the user notes, at the location established by the coordinates, the fact of contact and color and diameter of the particular marker. The marker color may indicate a certain sort of cover growth, a particular kind of tree or bush or grass, for example, the marker size may indicate the actual physical area occupied by that sort of cover or some other factor concerning it and the statistical approach to the sampling method is effectuated by the noted contact of the pin point with the randomly positioned markers.

Since the indicia sheet can readily be changed and various problems can be posed by the random distribution of the markers and the nature and character and size of the markers, the teaching aid is quite flexible.

The same rectangular framework and coordinate system as well as the same indicia sheet can also be utilized to teach the normal use of various types of survey and sampling devices. For example, as shown in FIGURE 3 markers 32 can be randomly positioned on the subjacent indicia sheet. Subsequently the sheet can be utilized even without the bridge bar 38 and the pin 47 by utilizing certain well-known quadrats 56 and 57. Each of these is of a predetermined geometrical size and shape and encloses a certain circular area, in the case of the quadrat 56, or a rectangular area, in the case of the quadrat 57. The student then visually surveys the various markers 32 within the clear area of the quadrat, notes the rectangular coordinate position of the center of each thereof and their size, color or other significant characteristic.

Similarly, as shown in FIGURE 5 a multiple pin mechanism 61 can also be employed on the framework above the indicia sheet. The structure 61 includes a stand frame 62 having a lower bar 63 and an upper bar 64 serving as mountings for a number of pins 66, preferably ten in number, spaced apart in some known relationship to the subjacent coordinates 26 and 27 or 26¹ and 27¹. Each of the pins is pressed upwardly by a spring 67 in the same way as is the pin 47. When the mechanism 61 is positioned at random on the indicia sheet, the various pins 66 are depressed in succession. The student notes the number of subjacent markers 32 which are contacted by the depressed pins. For example, if he determines that two of the ten pins contact markers, he can determine that twenty percent (two out of ten) of the objects represented by the markers are statistically effective. If desired, a framework such as 61 can be mounted on the carriage 43.

With the framework and indicia sheet as shown or with other indicia sheets, the teaching of statistical methods for surveying ecological and comparable factors can readily be taught and can easily be employed for the purpose of establishing statistical approaches to ecological and comparable problems.

What is claimed is:

1. An artificial population model for teaching purposes and for use with markers of different diameters and having a predetermined thickness comprising a rectangular frame having upstanding marginal flanges, a planar base sheet secured to the bottom of said frame and spanning the space enclosed thereby, an upwardly exposed and visible indicia sheet supported on said base sheet, having a continuous uninterrupted upper surface and extending to said frame, means on said frame for releasably holding said indicia sheet against said base sheet, a bridge bar extending across said frame above said indicia sheet and spaced away from said indicia sheet more than said predetermined thickness, means for slidably mounting said bridge bar on said frame to move over said indicia sheet, a carriage slidably mounted on said bridge bar to move over said indicia sheet, said carriage being spaced away from said indicia sheet more than said predetermined thickness, an indicator pin, means mounting said pin on said carriage for movement between one position spaced away from contact with said indicia sheet by more than said predetermined thickness, another position in contact with one of said markers on said indicia sheet and a final position in contact with said indicia sheet, and a spring for urging said indicator pin toward said one position.

2. An artificial population model for teaching purposes and for use with markers having a predetermined thickness comprising a rectangular frame having upstanding marginal edges, an upwardly exposed and visible indicia sheet, having a continuous uninterrupted upper surface supported on said frame below said marginal edges, a bridge bar extending across said frame and spaced above said indicia sheet more than said predetermined thickness, means for slidably mounting said bridge bar on said flanges to move over said indicia sheet, a carriage slidably mounted on said bridge bar to move over said indicia sheet and spaced above said indicia sheet more than said predetermined thickness, an indicator pin, and means for mounting said pin on said carriage for sliding movement toward and away from said indicia sheet, said pin having a top end disposed above said carriage and having a bottom end movable between one position spaced more than said predetermined thickness from said indicia sheet and another position spaced less than said predetermined thickness from said indicia sheet.

References Cited in the file of this patent

UNITED STATES PATENTS

| | | |
|---|---|---|
| 641,283 | Evans | Jan. 16, 1900 |
| 690,446 | Levy | Jan. 7, 1902 |
| 933,910 | Loewenbach | Sept. 14, 1909 |
| 2,001,633 | Segovia | May 14, 1935 |
| 2,405,808 | Armbright | Aug. 13, 1946 |
| 2,516,569 | Harris | July 25, 1950 |
| 2,668,370 | Trimble | Feb. 9, 1954 |
| 2,924,896 | Kelly | Feb. 16, 1960 |
| 2,933,316 | Mancini | Apr. 19, 1960 |
| 3,025,613 | Mitchell | Mar. 20, 1962 |